US009669536B2

(12) United States Patent
Ito et al.

(10) Patent No.: US 9,669,536 B2
(45) Date of Patent: Jun. 6, 2017

(54) POWERED WORKING MACHINE

(71) Applicant: HITACHI KOKI CO., LTD., Tokyo (JP)

(72) Inventors: Yutaka Ito, Hitachinaka (JP); Itsushi Ogawa, Hitachinaka (JP); Junichi Toukairin, Hitachinaka (JP); Jyun Enta, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 82 days.

(21) Appl. No.: 14/582,686

(22) Filed: Dec. 24, 2014

(65) Prior Publication Data
US 2015/0183107 A1 Jul. 2, 2015

(30) Foreign Application Priority Data

Dec. 27, 2013 (JP) .................................. 2013-273075

(51) Int. Cl.
*B25F 5/02* (2006.01)
*B23D 51/10* (2006.01)
(Continued)

(52) U.S. Cl.
CPC ................ *B25F 5/02* (2013.01); *B23D 51/10* (2013.01); *B24B 23/04* (2013.01); *B24B 27/08* (2013.01);
(Continued)

(58) Field of Classification Search
CPC ......... B23B 31/10; B27B 19/006; B27B 5/30; B27B 5/32; B24B 23/04; B24B 23/02;
(Continued)

(56) References Cited

U.S. PATENT DOCUMENTS 7,344,435 B2 * 3/2008 Pollak .................. B24B 45/006
451/342
9,283,645 B2 * 3/2016 Schraeder ................ B23Q 3/12
(Continued)

FOREIGN PATENT DOCUMENTS

EP 0776634 A3 6/1997
JP 2012-232381 A 11/2012
(Continued)

OTHER PUBLICATIONS

Machine translation of WIPO publication, WO2013065615, "Working Tool", Ikuta, H. et al., May 2013.*
(Continued)

*Primary Examiner* — Eric A Gates
*Assistant Examiner* — Chwen-Wei Su
(74) *Attorney, Agent, or Firm* — McDermott Will & Emery LLP

(57) ABSTRACT

A powered working machine facilitating work of fixing a tip tool to a tool supporting member is provided. A powered working machine in which a tip tool is driven by power of an electric-powered motor includes: an output shaft to which the tip tool is attached; a tool fixing member which fixes the tip tool to the output shaft; a second shaft to/from which the tool fixing member is attached/detached; a clamp having a locked state in which a state of attachment of the tool fixing member to the second shaft is maintained and an unlocked state in which the tool fixing member can be detached from the second shaft; and a guide member having a first rotation position at which the clamp is in the locked state and a second rotation position at which the clamp is in the unlocked state.

9 Claims, 11 Drawing Sheets

(51) Int. Cl.
　　　*B27B 19/00*　　　(2006.01)
　　　*B24B 45/00*　　　(2006.01)
　　　*B27B 5/32*　　　　(2006.01)
　　　*B24B 23/04*　　　(2006.01)
　　　*B24B 27/08*　　　(2006.01)
　　　*B23B 31/10*　　　(2006.01)

(52) U.S. Cl.
　　　CPC .............. *B24B 45/006* (2013.01); *B27B 5/32* (2013.01); *B27B 19/006* (2013.01); *B23B 31/10* (2013.01); *Y10T 279/33* (2015.01)

(58) Field of Classification Search
　　　CPC . B24B 45/006; Y10T 279/33; Y10T 83/9457; Y10T 83/7045; Y10T 83/931; B23D 61/006; B25F 3/00; B25F 5/00
　　　See application file for complete search history.

(56) References Cited

U.S. PATENT DOCUMENTS

| | | | |
|---|---|---|---|
| 2002/0028644 A1* | 3/2002 | Rudolf | B24B 23/02 451/344 |
| 2003/0190877 A1* | 10/2003 | Gallagher | B24B 23/02 451/344 |
| 2009/0023371 A1* | 1/2009 | Blickle | B24B 45/006 451/359 |
| 2010/0197208 A1* | 8/2010 | Blickle | B24B 23/02 451/342 |
| 2012/0086177 A1* | 4/2012 | Zhou | B25F 5/00 279/140 |
| 2012/0139196 A1* | 6/2012 | Zhou | B23D 61/006 279/140 |
| 2012/0211951 A1 | 8/2012 | Montplaisir et al. | |
| 2012/0292864 A1* | 11/2012 | Zhou | B27B 5/32 279/141 |
| 2015/0042052 A1 | 2/2015 | Furusawa et al. | |

FOREIGN PATENT DOCUMENTS

| | | | | |
|---|---|---|---|---|
| JP | WO 2013065615 A1 * | 5/2013 | ............. | B24B 23/04 |
| JP | WO 2013176217 A1 * | 11/2013 | ............. | B24B 23/04 |
| WO | 2013/115142 A1 | 8/2013 | | |

OTHER PUBLICATIONS

Extended European Search Report issued in Application No. 142004420.9 dated Jun. 19, 2015.

* cited by examiner

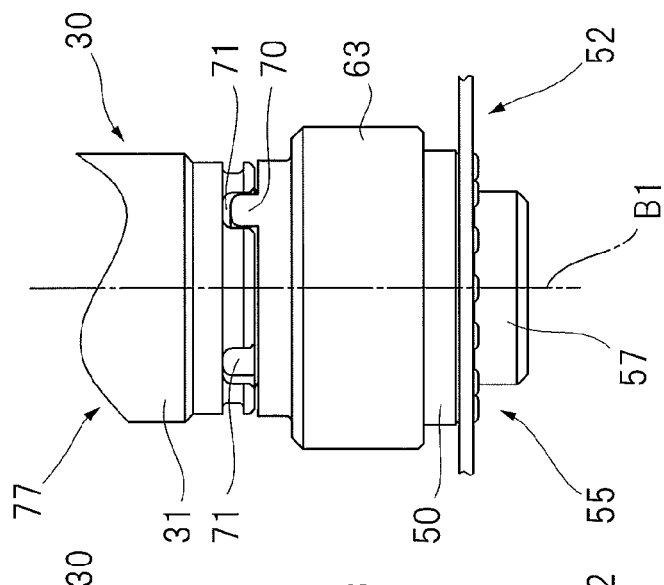
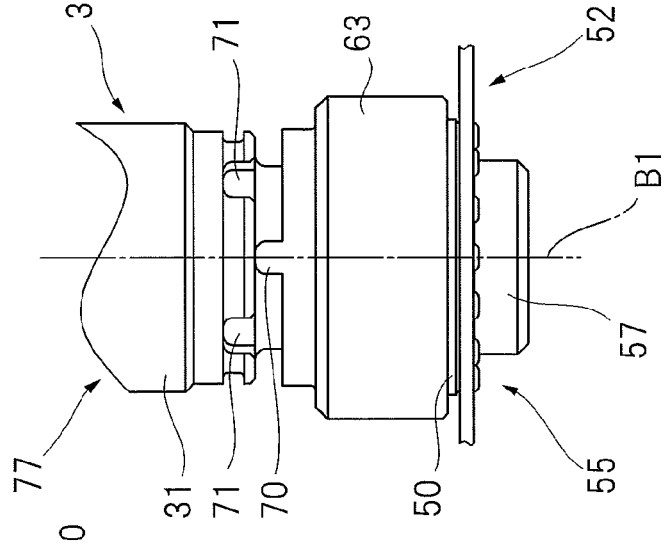
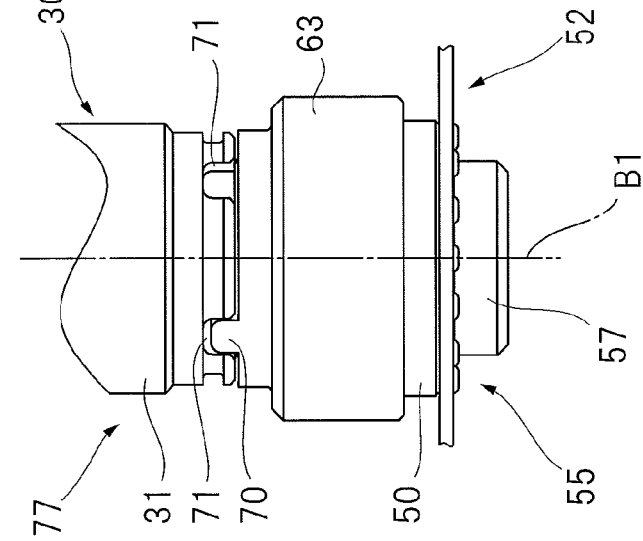

POWERED WORKING MACHINE

CROSS-REFERENCE TO RELATED APPLICATION

The present application claims priority from Japanese Patent Application No. 2013-273075 filed on Dec. 27, 2013, the content of which is hereby incorporated by reference into this application.

TECHNICAL FIELD OF THE INVENTION

The present invention relates to a powered working machine having a tip tool driven by power from an electric-powered working motor serving as a driving source.

BACKGROUND OF THE INVENTION

An electric-powered working machine that actuates a tip tool by power from an electric-powered motor serving as a driving source so as to perform hand working has been conventionally known, and such an electric-powered working machine is described in Japanese Patent Application Laid-Open Publication No. 2012-232381 (Patent Document 1). The powered working machine described in Patent Document 1 includes: a machine main body; an electric-powered motor housed in the machine main body; a power converting mechanism arranged inside the machine main body; and a battery pack attached/detached to/from the machine main body. The machine main body has an output shaft, and the output shaft is supported so as to be freely rotate. A distal end of the output shaft is arranged outside the machine main body, and a tool supporting unit is provided to the distal end of the output shaft. The output shaft has a screw hole, and an operator inserts a bolt into the screw hole and tightens them, so that the tip tool is fixed to the tool supporting unit.

The electric-powered motor has a motor shaft, and the power converting mechanism converts the rotational force of the motor shaft into the rotational force of the output shaft. When power of the battery pack is supplied to the electric-powered motor, the motor shaft rotates in one direction, and the power converting mechanism rotates the output shaft clockwise and counterclockwise within a predetermined angle range. The tip tool rotates together with the output shaft clockwise and counterclockwise within a predetermined angle range, so that work of peeling a workpiece off is performed. When the tip tool is replaced in the powered working machine described in Patent Document 1, the operator rotates the bolt to loosen the tip tool and rotates the bolt to fasten the tip tool.

SUMMARY OF THE INVENTION

However, in the powered working machine described in Patent Document 1, when the operator perform a work of attachment/detachment of the tip tool to/from the tool supporting unit, the operator has to rotate the bolt, and therefore, the work is complicated.

An object of the present invention is to provide a powered working machine that facilitates a work of attachment/detachment of a tip tool to/from a tool supporting unit.

A powered working machine according to one embodiment is a powered working machine that drives a tip tool by power of a driving source, including: a tool supporting member to which the tip tool is fixed; a tool fixing member which cooperates with the tool supporting member to clamp the tip tool in a direction along an axis line; a fixing mechanism which is provided so as to be movable in the direction along the axis line and which generates or releases a force with which the tool supporting member and the tool fixing member clamp the tip tool; and an attachment mechanism which can rotate so as to center the axis line and which can attach/detach the tool fixing member to/from the tool supporting member.

A powered working machine according to another embodiment is a powered working machine which drives a tip tool by power of a driving source, including: a tool supporting member to which the tip tool is fixed; a tool fixing member which cooperates with the tool supporting member to clamp the tip tool in the direction along the axis line of the tool supporting member; a fixing mechanism which is provided so as to be movable in the direction along the axis line and which generates or releases a force with which the tool supporting member and the tool fixing member clamp the tip tool; an operating member which causes the fixing mechanism to move in the direction along the axis line; and an attachment mechanism which can rotate so as to center the axis line and which allows the tool fixing member to be attached/detached to/from the tool supporting member. The tip tool can be detached from the tool supporting member by moving the fixing mechanism in the direction along the axis line, and then, rotating the attachment mechanism.

According to the present invention, the tip tool can be attached/detached to/from the tool supporting member without rotating the tool fixing member, so that the work can be facilitated.

BRIEF DESCRIPTIONS OF THE DRAWINGS

FIGS. 3A to 3C are side views each showing a first specific example of an attachment mechanism provided in the powered working machine;

Figure 10:
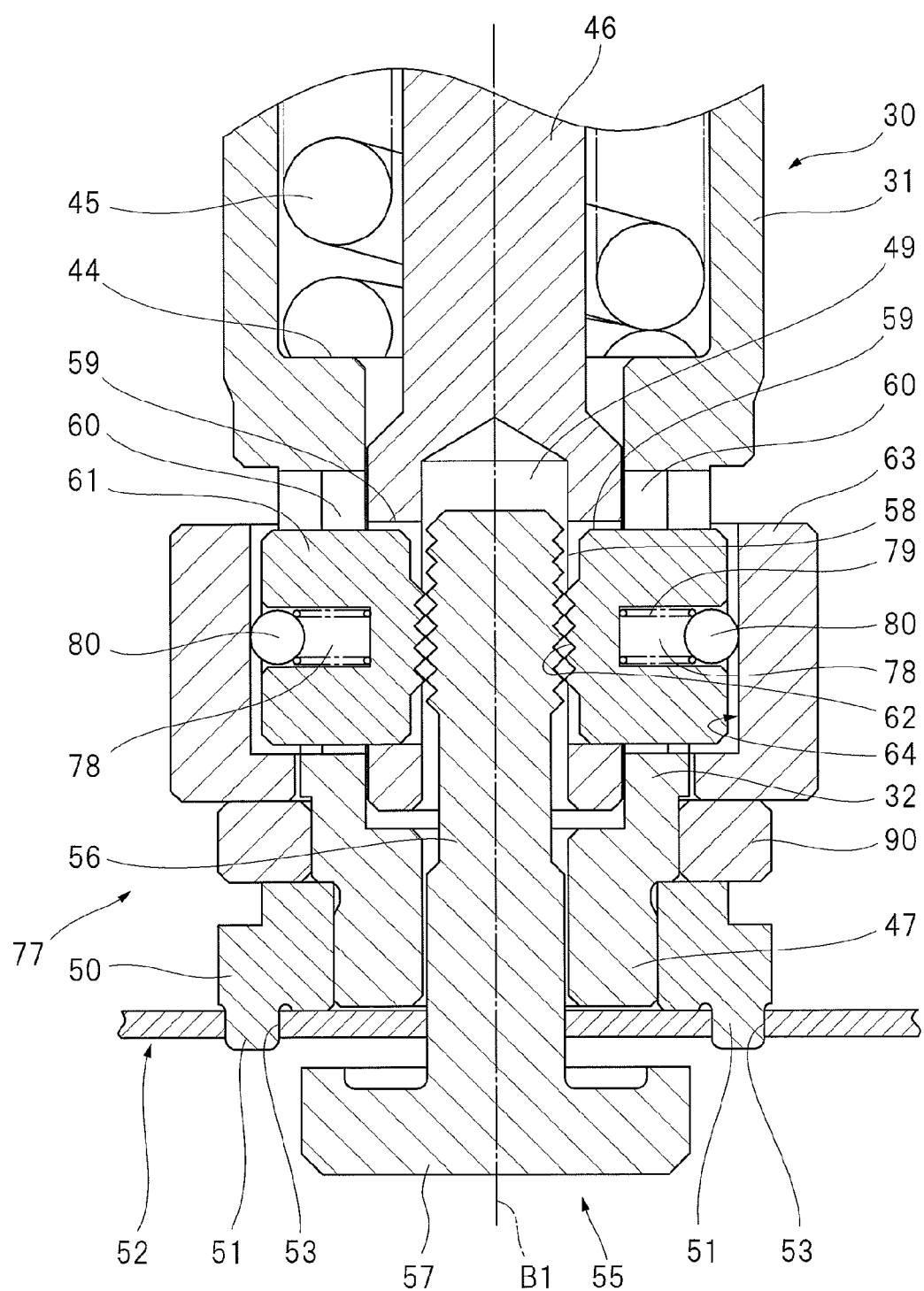
Figure 11A:
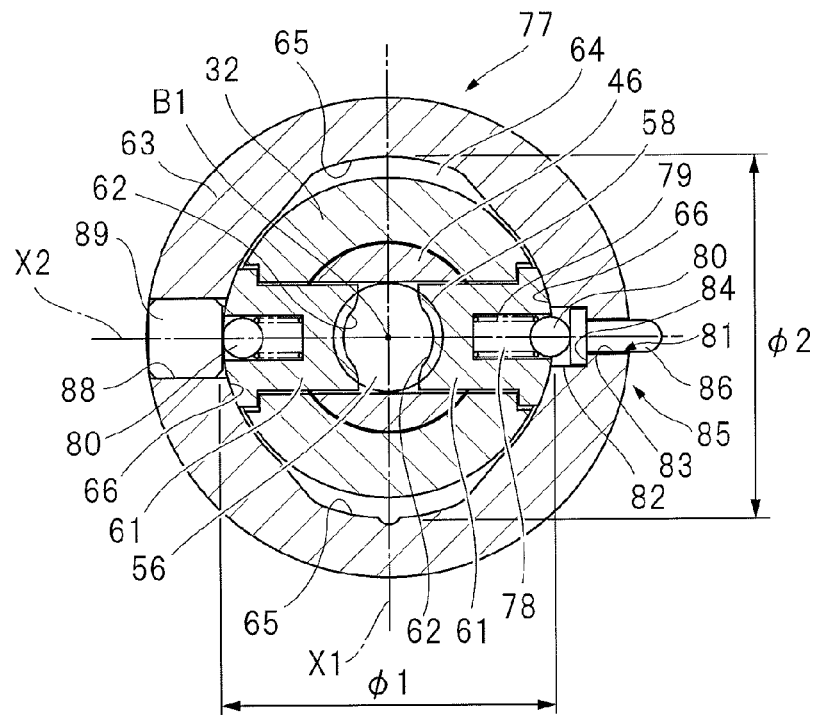
Figure 11B:
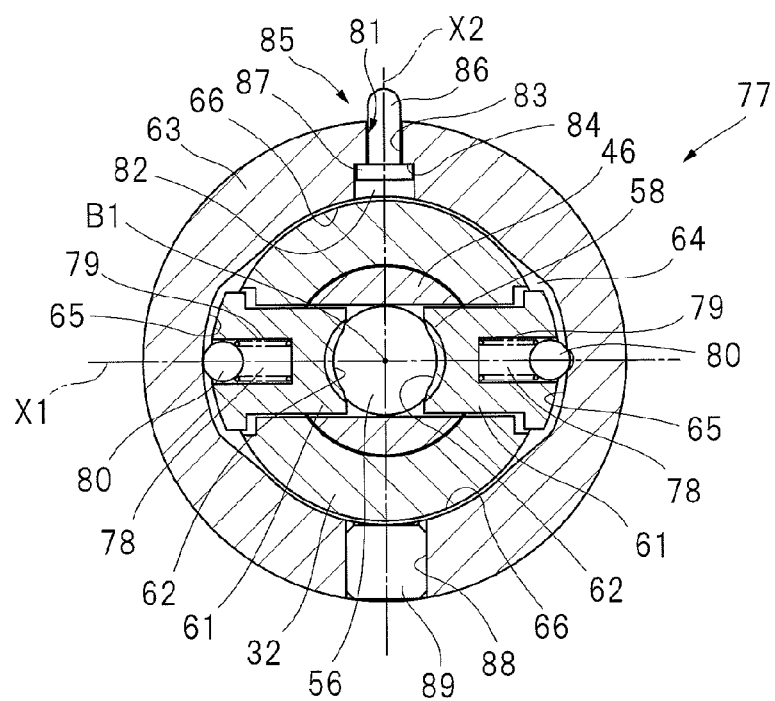

FIG. 10 is aside cross-sectional view showing a state in which the clamp member is released from its lock state in the second specific example of the attachment mechanism; and FIG. 11A is a plan cross-sectional view showing a state in which a clamp member is locked in the second specific example of the attachment mechanism, and FIG. 11B is a plan cross-sectional view showing a state in which the clamp member is released from its locked state in the second specific example of the attachment mechanism.

DESCRIPTIONS OF THE PREFERRED EMBODIMENTS

Hereinafter, embodiments of the present invention will hereinafter be described in detail with reference to drawings. In a plurality of drawings used to describe the embodiments, the same components will be denoted by the same reference symbol. A powered working machine of the present invention will be described with reference to FIGS. 1 to 6. As an embodiment of the powered working machine, a powered working machine in which a tip tool is driven by an electric-powered motor will be described. A powered working machine 10 shown in FIG. 1 includes: a machine main body 12 housing an electric-powered motor 11 therein; and a battery pack 13 that supplies power to the electric-powered motor 11. The battery pack 13 can be attached/detached to/from the machine main body 12. The powered working machine 10 is a cordless type working machine whose machine main body 12 has no power cord connected to a commercial power supply outlet.

The machine main body 12 includes: a motor housing 14 through which a first axis line A1 penetrates; and a cover 15 attached to one end of the motor housing 14 in a direction along the first axis line A1. The motor housing 14 and the cover 15 are separate units from each other, and the cover 15 is fixed to the motor housing 14 with a fixing element. The motor housing 14 is cylindrically shaped, and the motor housing 14 has a mounting unit 16. The mounting unit 16 is provided to be opposite to the end to which the cover 15 is attached in the direction along the first axis line A1. The battery pack 13 is attached/detached to/from the mounting unit 16.

The electric-powered motor 11 serving as a power source is arranged in the motor housing 14. The electric-powered motor 11 has a motor shaft 17. A main switch 18 is arranged in the motor housing 14, and a lever 19 operated by an operator is arranged on the outer wall of the motor housing 14. The lever 19 is movable along the motor housing 14. A link 20 that transmits an operating force applied to the lever 19 to the main switch 18 is arranged in the motor housing 14.

A controller 21 is also arranged in the motor housing 14. The controller 21 is arranged between the mounting unit 16 and the main switch 18 in the direction along the first axis line A1. A speed adjusting dial 22 is also arranged in the motor housing 14. The speed adjusting dial 22 is a mechanism that sets the target number of revolutions of the electric-powered motor 11, and the speed adjusting dial 22 is operated by the operator. The controller 21 is a publicly-known microcomputer having a drive circuit, a computing unit, a memory unit, an input port, an output port, etc. The controller 21 is connected to the speed adjusting dial 22 and the main switch 18 via a signal cable. Also, the controller 21 generates a control signal.

The configuration of the mounting unit 16 will then be described. In a side view of the powered working machine 10, the first axis line A1 penetrates through the mounting unit 16 and the motor axis 17. A plurality of tool-side terminals 23 are fixed to the mounting unit 16. The plurality of tool-side terminals 23 are connected to the controller 21 via a power cable and a signal cable. The plurality of tool-side terminals 23 are shaped in a plate, and the plurality of tool-side terminals 23 are exposed outside from the machine main body 12. The mounting unit 16 is provided with a first guide rail and a first guide groove. Further, the mounting unit 16 is provided with a display unit 24. The display unit 24 is connected to the controller 21 via a signal cable. The display unit 24 is an indicator that displays the volume of power the battery pack 13, that is, the remaining volume.

The configuration of the battery pack 13 will be described. The battery pack 13 has a plurality of battery cells 25 and a case 26 housing the plurality of battery cells 25 therein. The battery cells 25 are secondary battery cells which can be repeatedly charged and discharged. The battery cells 25 include a lithium ion battery cell, a nickel-hydrogen battery cell, a lithium ion polymer battery cell, a nickel-cadmium battery cell, and others.

A circuit board is arranged in the case 26, and the circuit board is connected to the battery cells 25 via power cables. The circuit board has a plurality of cell-side terminals 27, and the plurality of cell-side terminals 27 are exposed outside from the case 26. The case 26 is provided with a second guide rail and a second guide groove.

When the battery pack 13 is attached to the mounting unit 16 or the battery pack 13 is detached from the mounting unit 16, the direction of movement of the battery pack 13 is regulated by the first and second guide rails and the first and second guide grooves. When the battery pack 13 is attached to the mounting unit 16, the plurality of tool-side terminals 23 are connected to the plurality of cell-side terminals 27, respectively.

When the battery pack 13 is attached to the mounting unit 16, power of the battery pack 13 can be supplied to the controller 21. A portion of the motor housing 14 which is between the lever 19 and the mounting unit 16 in the direction along the first axis line A1 becomes a grip 28, and the grip 28 is held by the operator.

Figure 1:
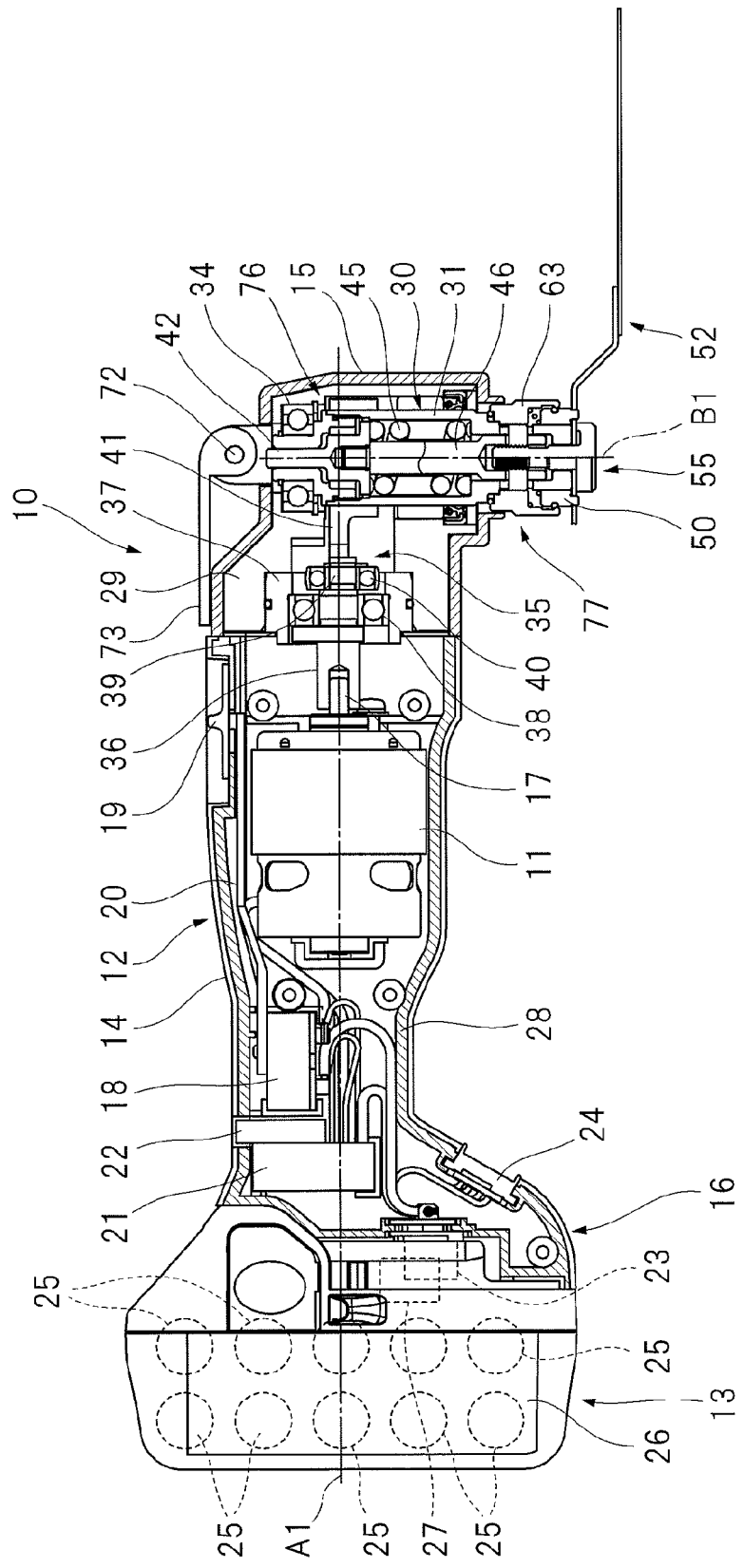
FIG. 1 is a side cross-sectional view of a powered working machine according to an embodiment of the present invention.
Figure 2:
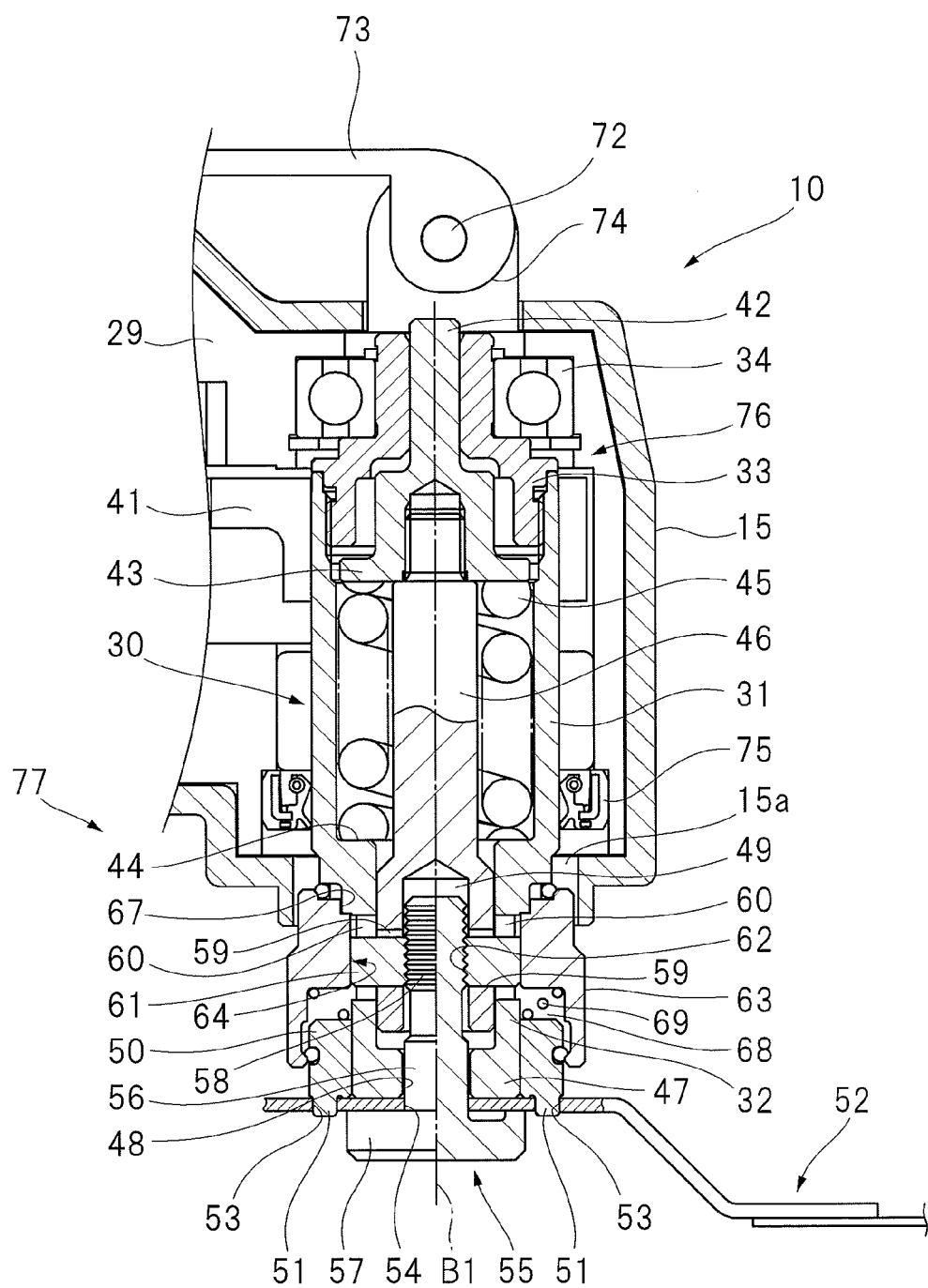
FIG. 2 is a side cross-sectional view of a principal part of the powered working machine.

On the other hand, as shown in FIGS. 1 and 2, a holder 29 made of synthetic resin is arranged inside the cover 15. By the holder 29, an output shaft 30 is supported via a bearing so as to rotate freely. The output shaft 30 is cylindrical, and the output shaft 30 has a large-diameter portion 31 and a small-diameter portion 32. The large-diameter portion 31 and small-diameter portion 32. The large-diameter portion 31 and the small-diameter portion 32 are formed continuously in a direction along a second axis line B1, and a support shaft 33 is fixed to the large-diameter portion 31. A portion of the large-diameter portion 31 that is close to the small-diameter portion 32 is arranged inside a shaft hole 15a of the cover 15. The support shaft 33 is cylindrical, and the support shaft 33 is supported by the holder 29 via a bearing 34 so as to freely rotate. The support shaft 33 and the output shaft 30 are arranged so as to be concentric with each other, the support shaft 33 and the output shaft 30 rotate together, and the support shaft 33 and the output shaft 30 are supported by the holder 29 so that they do not move in the direction along the second axis line B1. The small-diameter portion 32 of the output shaft 30 is arranged outside the cover 15.

A power transmission mechanism 35 is arranged inside the holder 29. The power transmission mechanism 35 is a mechanism that converts a rotational force of the motor shaft 17 into a force which reciprocates the output shaft 30 within a predetermined range of angle. The power transmission mechanism 35 has a spindle 36 that rotates together with the motor shaft 17. This spindle 36 is arranged to be concentric with the motor shaft 17. A cylindrical sleeve 37 is arranged inside the holder 29, and a bearing 38 is attached to the sleeve 37. The bearing 38 supports the spindle 36 so that the spindle 36 can rotate. A center line of the spindle 36 is in coaxial with the first axis line A1 of the motor shaft 17, and the spindle 36 is provided with an eccentric shaft 39. A center line of the eccentric shaft 39 is arranged at a position which is eccentric from the first axis line A1. To an outer peripheral surface of the eccentric shaft 39, an inner ring of a ball bearing 40 is attached.

A swing arm 41 which connects the outer ring of the ball bearing 40 to the output shaft 30 is provided. The swing arm 41 is fixed to the large-diameter portion 31 of the output shaft 30. The swing arm 41 is formed into a U shape having paired arms extending in parallel with the motor shaft 17. The paired arms are arranged at an interval equal to the outer diameter of the outer ring of the ball bearing 40. The paired arms are in contact with the outer ring of the ball bearing 40. In other words, the outer ring of the ball bearing 40 is sandwiched between the paired arms. A seal member 75 is attached to the holder 29. The seal member 75 is an annular oil seal, a seal lip of the oil seal is in contact with the outer peripheral surface of the large-diameter portion 31.

A first shaft 42 is arranged in the above-described support shaft 33. The first shaft 42 is movable in the direction along the second axis line B1, and the first shaft 42 is partially arranged inside the large-diameter portion 31. An outward flange 43 is arranged in the part of first shaft 42 which is arranged inside the large-diameter portion 31. A stepped portion 44 is formed between the large-diameter portion 31 and the small-diameter portion 32. An elastic body 45 is arranged between the stepped portion 44 and the outward flange 43 in the output shaft 30. The elastic body 45 is a metal compression coil spring, and the elastic body 45 can be expanded and contracted in the direction along the second axis line B1. The force of the elastic body 45 is applied to the first shaft 42 so that the first shaft 42 is pushed in a direction away from the stepped portion 44. As a result of the push to the first shaft 42 by the force of the elastic body 45, an end of the first shaft 42 is positioned outside the support shaft 33.

A second shaft 46 is arranged so as to extend over inside of the large-diameter portion 31 into the small-diameter portion 32. One end of the second shaft 46 in the direction along the second axis line B1 is fixed to the first shaft 42. Therefore, the first and second shafts 42 and 46 can move together in the direction along the second axis line B1. That is, the first and second shafts 42 and 46 can move in their longitudinal direction.

A tool supporting unit 47 is arranged on the end of the small-diameter portion 32 of the output shaft 30 in the direction along the second axis line B1. A shaft hole 48 is formed on the tool supporting unit 47. Also, a retaining hole 49 is formed on an end of a portion of the second shaft 46 which is arranged in the small-diameter portion 32. The shaft hole 48 and the retaining hole 49 are formed so as to center the second axis line B1.

Further, a holder 50 is fixed to the outer periphery of the small-diameter portion 32. The holder 50 is annular, and the holder 50 has a rotation stopper 51. The rotation stopper 51 protrudes from an end surface of the holder 50 in the direction along the second axis line B1. A plurality of rotation stoppers 51 are formed on the same circumference as each other so as to center the second axis line B1. An end surface of the tool supporting unit 47 and the end surface of the holder 50 are positioned on the same plane as each other. The same plane is perpendicular to the second axis line B1. A tip tool 52 is attached to the tool supporting unit 47. The tip tool 52 is shaped into a plate, and has a rotation-stopper hole 53 and a fixing hole 54. A plurality of rotation-stopper holes 53 are formed on a circumference so as to be outside the fixing hole 54 and so as to center the second axis line B1.

Further, a tool fixing member 55 which fixes the tip tool 52 to the tool supporting unit 47 is provided. The tool fixing member 55 cooperates with the tool supporting unit 47 to clamp the tip tool 52 from both sides in the direction along the second axis line B and fix the tip tool. The tool fixing member 55 has a shaft unit 56 and a head unit 57 formed on one end of the shaft unit 56. The tool fixing member 55 can be attached/detached to/from the second shaft 46. The head unit 57 is arranged outside the output shaft 30, while the shaft unit 56 is arranged so as to extend over the shaft hole 48 and the retaining hole 49. A first falling-stopper portion 58 is formed on the outer periphery of the shaft unit 56. The first falling-stopper portion 58 is formed by forming a plurality of annular convex/concave portions centering the second axis line B1 at a constant interval in the direction along the second axis line B1. The convex/concave portion may be a male screw thread. The outer diameter of the shaft unit 56 is smaller than the inner diameter of the shaft hole 48, the inner diameter of the retaining hole 49, and the inner diameter of the fixing hole 54. Therefore, the tool fixing member 55 can be moved in the direction along the second axis line B1 so that the shaft unit 56 enters the shaft hole 48 and the retaining hole 49 or comes out of the shaft hole 48 and the retaining hole 49.

Meanwhile, a hole 59 is formed on the portion of the second shaft 46 which is arranged inside the small-diameter portion 32. The hole 59 is formed at two positions which are apart from each other by 180 degrees in a circumference direction centering the second axis line B1, and the holes 59 penetrate through the second shaft 46 in a radial direction. Also, a hole 60 is formed on the small-diameter portion 32. The hole 60 is formed at two positions which are apart from each other by 180 degrees in a circumference direction centering the second axis line B1, and the holes 60 penetrate through the small-diameter portion 32 in a radial direction.

Further, a clamp 61 is arranged inside one hole 59 and one hole 60. Two clamps 61 are provided, and the clamps 61 can move along the holes 59 and 60 in a radial direction centering the second axis line B1. In other words, the two clamps 61 can move in the direction crossing the second axis line B1. In the hole 60, the clamps 61 can move in the direction along the second axis line B1. An inner end of the clamp 61 in the radial direction centering the second axis line B1 has an arc surface having the same curvature as that of the shaft unit 56, and a second falling-stopper portion 62 is formed on the arc surface. The arc surface is of an arc shape on a plane perpendicular to the second axis line B1. The second falling-stopper portion 62 is formed by forming a plurality of convex/concave portions on the arc surface at a constant interval in the direction along the second axis line B1. The convex/concave portion may be a female screw thread. The shaft unit 56 is arranged between the two clamps 61. In other words, the two clamps 61 are arranged outside the shaft unit 56 in the radial direction centering the second axis line B1.

Further, a guide member 63 which regulates the movement of the two clamps 61 in the radial direction is provided. The guide member 63 is an annular body centering the second axis line B1, and the guide member 63 is arranged from outside of the large-diameter portion 31 to outside of the holder 50 in the direction along the second axis line B1. The guide member 63 is cylindrical, and the guide member 63 has a guide hole 64. The guide member 63 is arranged outside the two clamps 61 in the direction crossing the second axis line B1.

The guide hole 64 is provided so as to center the second axis line B1, and the small-diameter portion 32 of the output shaft 30 is arranged inside the guide hole 64. The shape of the guide hole 64 on a plane perpendicular to the second axis line B1 is as follows. Four curved surfaces 65 and 66 are formed on the inner circumference of the guide hole 64. Both of the four curved surfaces 65 and 66 have an arc shape. The four curved surfaces 65 and 66 are swelled outward in the radius direction centering the second axis line B1. The curved surfaces 65 and 66 are smoothly connected to each other. Positions and shapes of two curved surfaces 65 are symmetric with respect to a point so as to center the second axis line B1. Positions and shapes of two curved surfaces 66 are also symmetric with respect to a point so as to center the second axis line B1. In other words, the guide hole 64 is of an elliptical shape.

FIG. 4 shows two unreal lines X1 and X2 which intersect at the second axis line B1 and which are at a right angle with each other. The unreal line X1 passes through the centers of the curved surfaces 65 in the circumference direction centering the second axis line B1, while the unreal line X2 passes through the centers of the curved surfaces 66 in the circumference direction centering the second axis line B1. In other words, the curved surfaces 65 and 66 are arranged alternately along the circumference direction centering the second axis line B1.

An inner diameter φ1 passing through the second axis line B1 and connecting the two curved surfaces 65 changes in the circumference direction centering the second axis line B1. The inner diameter φ1 of the two curved surfaces 65 is maximized on the unreal line X1. On the other hand, an inner diameter φ2 passing through the second axis line B1 and connecting the two curved surfaces 66 is constant in the circumference direction centering the second axis line B1. The inner diameter φ1 is larger than the inner diameter φ2, and the inner diameter φ2 is larger than the outer diameter of the small-diameter portion 32. And, the inner diameter φ1 is maximized on the unreal line X1. That is, the unreal line X1 passing through the second axis line B1 includes a long axis while the unreal line X2 passing through the second axis line B1 includes a short axis.

The guide member 63 has concave portions 67 and 68 on both sides of the guide hole 64 in the direction along the second axis line B1. The concave portions 67 and 68 are formed so as to center the second axis line B1, and the concave portions 67 and 68 are connected to the guide hole 64. The inner diameter of the concave portion 67 is larger than the inner diameter φ1, and the inner diameter of the concave portion 68 is also larger than the inner diameter φ1. The output shaft 30 is partially arranged in the concave portion 67, and the holder 50 is partially arranged in the concave portion 68. The guide member 63 can rotate freely from the output shaft 30 and the holder 50 so as to center the second axis line B1. And, the guide member 63 can move freely from the output shaft 30 and the holder 50 in the direction along the second axis line B1.

An elastic body 69 is arranged in the concave portion 68. The elastic body 69 is a metal compression coil spring, and the guide member 63 is pushed by the force of the elastic body 69 in the direction of approaching the large-diameter portion 31 along the second axis line B1. A protrusion 70 is formed on the inner peripheral surface of the concave portion 67. The protrusion 70 protrudes inward from the inner peripheral surface of the concave portion 67 in the radial direction centering the second axis line B1. The protrusion 70 is formed at one position in the circumference direction centering the second axis line B1. The protrusion 70 protrudes inward from the inner peripheral surface of the concave portion 67 in the radial direction centering the second axis line B1. A concave portions 71 is formed on the outer peripheral surface of the part of large-diameter portion 31 of the output shaft 30 which is arranged inside the concave portion 67. The concave portion 71 is arranged at a plurality of positions, e.g., four positions, in the circumference direction centering the second axis line B1. The concave portions 71 at four positions are arranged at an interval of 90 degrees from each other in the circumference direction centering the second axis line B1.

A lever 73 is attached to the cover 15 via a support shaft 72. The lever 73 is operated by the operator and can move in a predetermined range of angle so as to center the support shaft 72. In the lever 73, a cam surface 74 is formed outside the support shaft 72. The cam surface 74 is curved so as to have a smoothly-varying radius centering the support shaft 72.

A fixing mechanism 76 of the powered working machine 10 includes the first and second shafts 42 and 46. The fixing mechanism 76 plays a role of creating or releasing a force with which the tip tool 52 is fixed to the tool supporting unit 47. An attachment mechanism 77 of the powered working machine 10 includes the guide member 63, the clamps 61, the elastic body 69, and others. The attachment mechanism 77 is operated by the operator when the tip tool 52 is attached/detached to/from the tool supporting unit 47.

When the powered working machine 10 having the above-described configuration is used, each component is under the following conditions. When the lever 73 is held in an initial position, the cam surface 74 does not come in contact with the first shaft 42. The first and second shafts 42 and 46 are pushed by the force of the elastic body 45 in the direction of approaching the support shaft 33.

Figure 5:
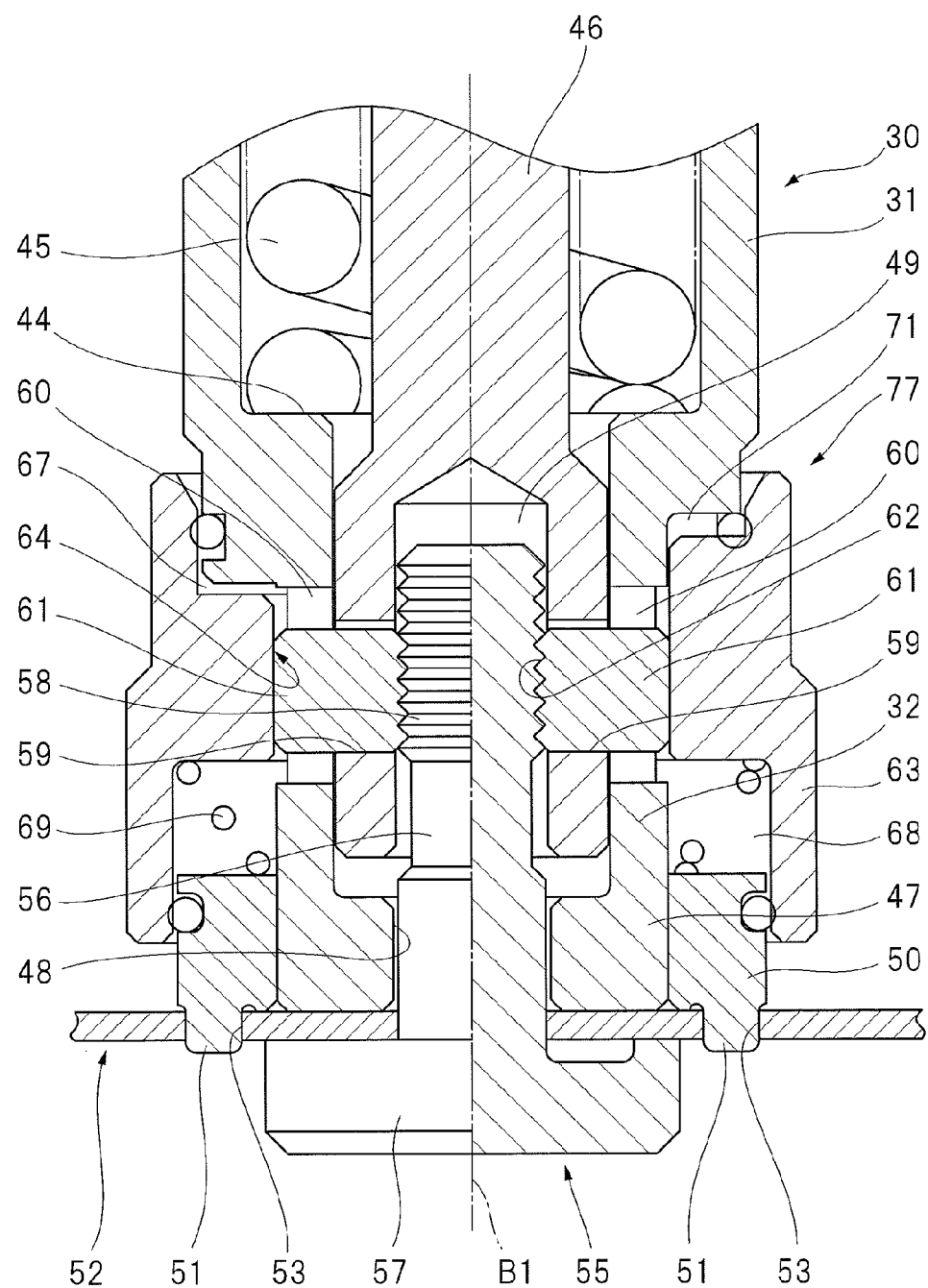
FIG. 5 is a side cross-sectional view showing a state in which a tool fixing member is fixed in the first specific example of the attachment mechanism.

Meanwhile, the shaft unit 56 of the tool fixing member 55 is inserted into the fixing hole 54 of the tip tool 52, and is arranged inside the shaft hole 48 and the retaining hole 49. As shown in FIGS. 3A and 5, the protrusion 70 of the guide member 63 is positioned inside the concave portion 71 of the output shaft 30, and the guide member 63 cannot be rotated with respect to the output shaft 30 by engagement force between the protrusion 70 and the inner surface of the concave portion 71. The guide member 63 is pushed toward the large-diameter portion 31 by the force of the elastic body 69 so that a state of positioning of the protrusion 70 of the guide member 63 inside the concave portion 71 of the output shaft 30 is maintained.

Figure 4A:
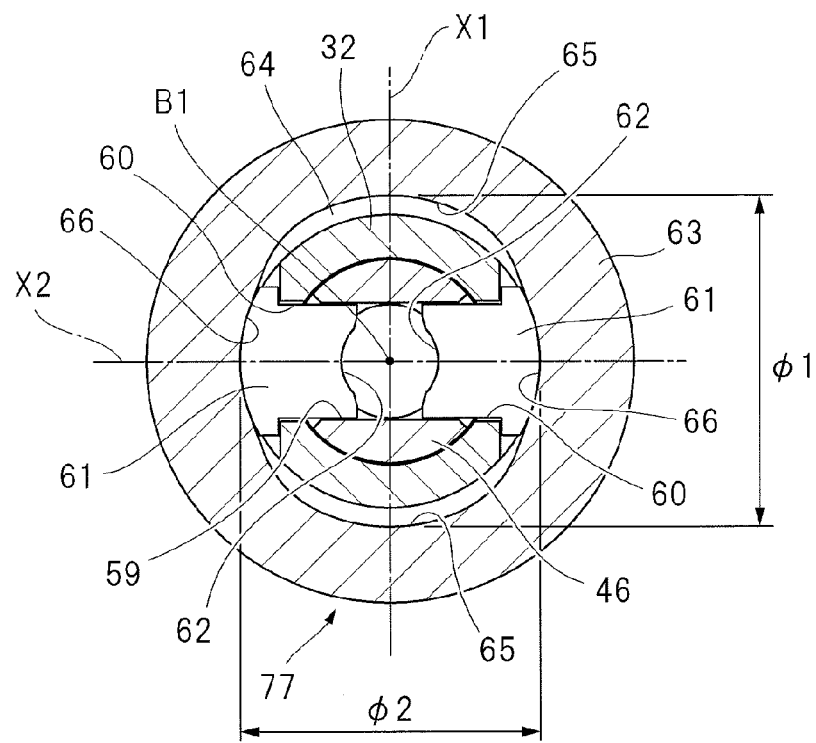
FIG. 4A is a plan cross-sectional view showing a state in which a clamp member is locked in the first specific example of the attachment mechanism.

When the guide member 63 cannot be rotated with respect to the output shaft 30 as shown in FIG. 5, the two clamps 61 are on the unreal line X2 as shown in FIG. 4A. In other words, the two clamps 61 are at the same position as that of the curved surfaces 66 in the circumference direction centering the second axis line B1. The second falling-stopper portion 62 of the two clamps 61 is engaged with the first falling-stopper portion 58 of the shaft unit 56, and both of the two clamps 61 are in contact with the curved surfaces 66. When the second falling-stopper portion 62 of the two clamps 61 is engaged with the first falling-stopper portion 58 of the shaft unit 56, the two clamps 61 are in their locked position. Because the inner diameter φ2 is smaller than the inner diameter φ1, the two clamps 61 cannot move in the radial direction centering the second axis line B1. In other words, the second shaft 46 and the tool fixing member 55 are fixed in the direction along the second axis line B1 by the force of engagement between the second falling-stopper portion 62 of the two clamps 61 and the first falling-stopper portion 58 of the shaft unit 56.

As described above, the tool fixing member 55 and the output shaft 30 can move in the direction along the second axis line B1 by a space formed between the two clamps 61 and the inner surface of the hole 60. The second shaft 46 is pushed by the force of the elastic body 45 in the direction of approaching the support shaft 33. Therefore, the tool fixing member 55 is pushed in the direction of approaching the output shaft 30. In this manner, when the tip tool 52 is clamped between the tool fixing member 55 and the output shaft 30 to fix the tip tool 52 in the direction along the second axis line B1, a state of the tool fixing member 55 is referred to as a fixed state. As the rotation stopper 51 is inserted into the hole 53, the tip tool 52 is pushed against the tool supporting unit 47. In this manner, such rotation of the tip tool 52 as centering the second axis line B1 is prevented.

The operator operates the lever 19 in a state that the battery pack 13 is mounted on the mounting unit 16, and, when the main switch 18 is turned on, power of the battery pack 13 is supplied through the controller 21 to the electric-powered motor 11, so that the motor shaft 17 of the electric-powered motor 11 rotates. On the other hand, when the lever 19 is operated to turn the main switch 18 off, the power of the battery pack 13 is not supplied to the electric-powered motor 11, and the motor shaft 17 of the electric-powered motor 11 stops.

In the powered working machine 10, when power is supplied to the electric-powered motor 11 to rotate the motor shaft 17 in one direction, the motor shaft 17 and the spindle 36 rotate together. When the spindle 36 rotates, the eccentric shaft 39 and the ball bearing 40 revolves so as to center the first axis line A1. When the ball bearing 40 revolves so as to center the first axis line A1, the swing arm 41 reciprocates within a predetermined range of angle so as to take the output shaft 30 as a pivot point. As a result, the output shaft 30 repeats alternately the forward rotation and the reverse rotation so as to center the second axis line B1 within the predetermined range of angle. In this manner, the rotational force of the electric-powered motor 11 is converted into the rotational force of the output shaft 30.

When the output shaft 30 rotates forward and reversely within the predetermined range of angle, the tip tool 52 also rotates so as to center the second axis line B1 within the predetermined range of angle. By pressing the tip tool 52 against the workpiece, the workpiece can be processed, e.g., polished.

Figure 6:
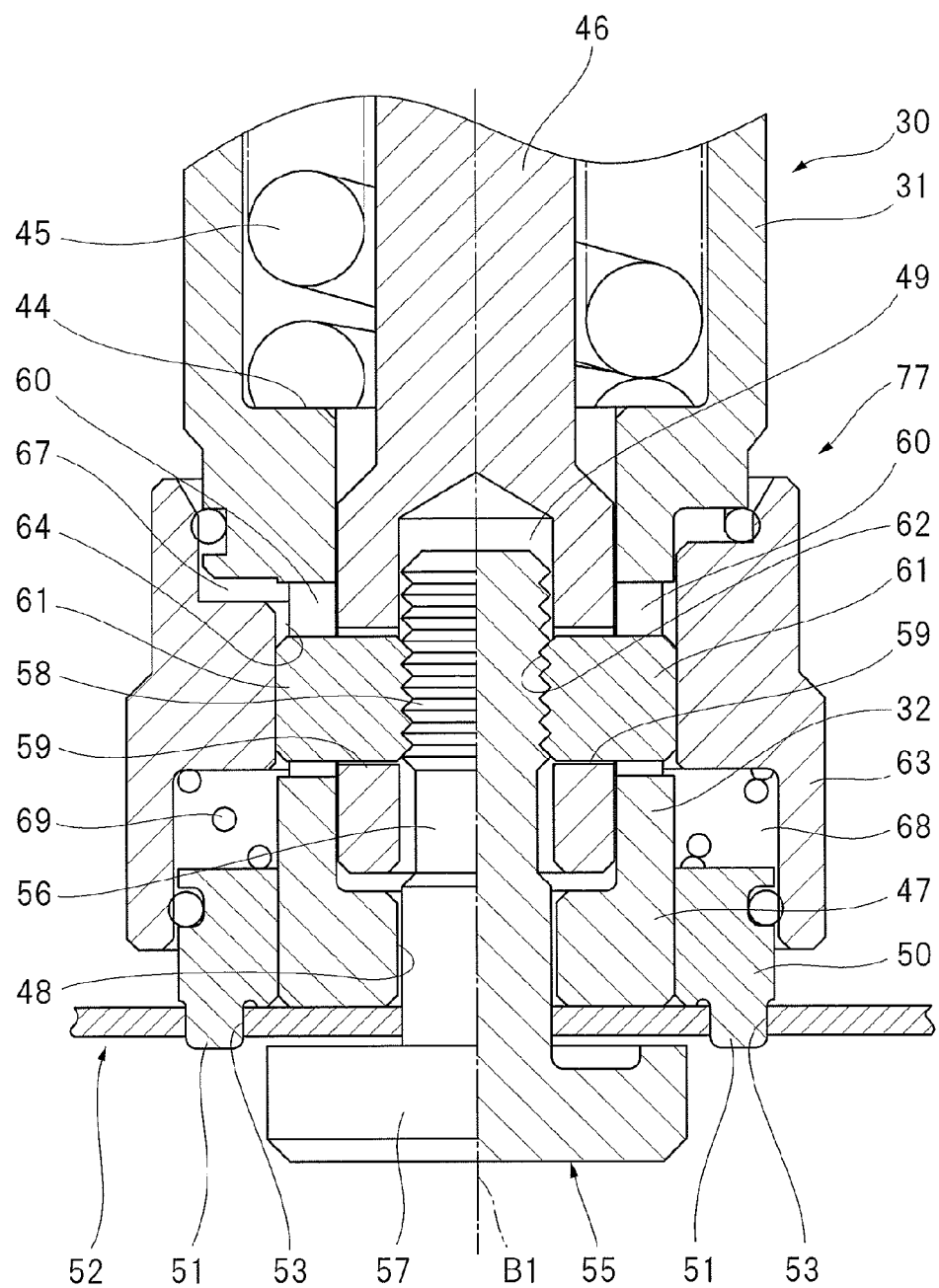
FIG. 6 is a side cross-sectional view showing a state in which the tool fixing member is released in the first specific example of the attachment mechanism.

On the other hand, when the tip tool 52 is detached, the operator operates as follows. The lever 73 is rotated clockwise by a predetermined angle from an initial position. Then, the cam surface 74 comes in contact with the first shaft 42, and pushes the first shaft 42 along the second axis line B1. As shown in FIG. 6, the first and second shafts 42 and 46 move in the direction of approaching the tool supporting unit 47 against the force of the elastic body 45, and then, stop. When the second shaft 46 moves in the direction of approaching the tool supporting unit 47, the tool fixing member 55 moves together with the second shaft 46 along the second axis line B1. Therefore, the force of the head portion 57 which presses the tip tool 52 against the tool supporting unit 47 is reduced. A state that the pressing pressure of the tool fixing member 55 applied to the tip tool 52 is reduced is a release state of the tool fixing member 55. Note that, even if the force that fixes the tip tool 52 to the output shaft 30 is reduced, the tool fixing member 55 is coupled to the second shaft 46, so that the tip tool 52 is not fallen off from the tool fixing member 55.

Then, the operator holds the guide member 63 with his/her hand, and moves the guide member 63 in the direction of approaching the holder 50 against the force of the elastic body 69. The operator moves the guide member 63 as shown in FIG. 6 so that the protrusion 70 is pulled out of the concave portion 71, and the guide member 63 is rotated with respect to the output shaft 30. Specifically, the guide member 63 is rotated with respect to the output shaft 30 from the position of FIG. 3A to a position of FIG. 3B, and then, the guide member 63 is stopped at a position at which it is rotated by 90 degrees from the position of FIG. 3A. The direction of rotation of the guide member 63 may be clockwise or counterclockwise in FIG. 4. When the operator stops the guide member 63 with respect to the output shaft 30 and releases his/her hand from the guide member 63, the guide member 63 is pushed by the force of the elastic body 69, so that the protrusion 70 enter the concave portion 71 as shown in FIG. 3C, and the guide member 63 does not rotate with respect to the output shaft 30.

Figure 4B:
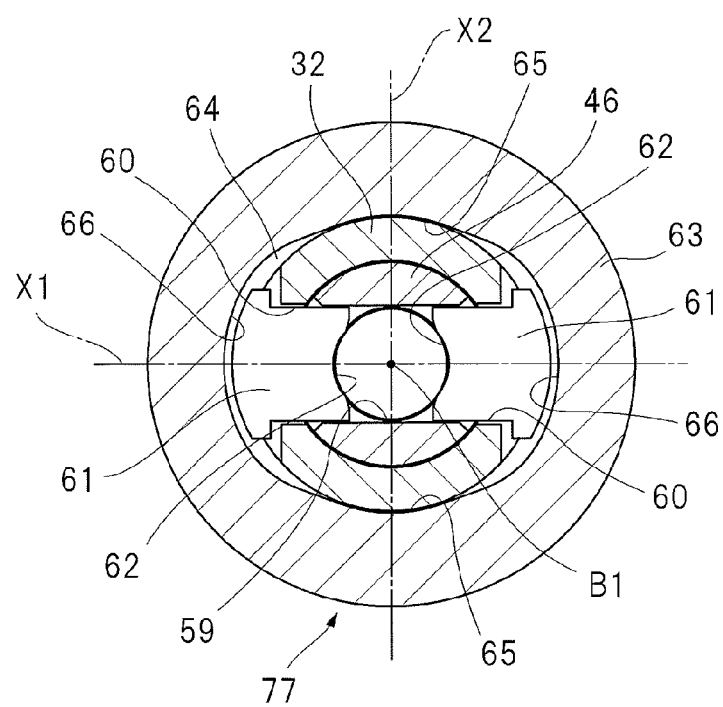
FIG. 4B is a plan cross-sectional view showing a state in which the clamp member is released from its locked state in the first specific example of the attachment mechanism.

In this manner, by rotating and stopping the guide member 63, a space is formed between the clamps 61 and the curved surfaces 66 when the two curved surfaces 65 and two clamps 61 are arranged at the same position in the circumferential direction centering the second axis line B1 as shown in FIG. 4B. Then, when the operator holds the tool fixing member 55 with his/her hand and pulls it in a direction away from the output shaft 30, the two clamps 61 are moved in a direction of approaching the curved surfaces 66 by a component of the force of engagement between the first falling-stopper portion 58 and the second falling-stopper portion 62. Therefore, the shaft unit 56 of the tool fixing member 55 can be pulled out of the retaining hole 49 and the fixing hole 54, and the tip tool 52 can be detached from the tool supporting unit 47.

In other words, as shown in FIG. 4B, when the clamps 61 are put in the movable state in the radial direction, the tool fixing member 55 can be moved with respect to the output shaft 30 in the direction along the second axis line B1. A state of the clamps 61 obtained when the tool fixing member 55 can be moved with respect to the output shaft 30 in the direction along the second axis line B1 is in the unlocked state or unlocked position. At this time, a position in the circumferential direction of the guide member 63 with respect to the output shaft 30 is referred to as second rotation position.

Next, work of attaching the tip tool 52 to the tool supporting unit 47 will be described. The operator inserts the shaft unit 56 of the tool fixing member 55 into the fixing hole 54 of the tip tool 52. When the clamps 61 are in their unlocked state, the operator moves the shaft unit 56 into the shaft hole 48. Then, the shaft unit 56 moves into a space between the two clamps 61 as shown in FIG. 4B.

Then, the operator holds the guide member 63 with his/her hand, and moves the guide member 63 in the direction of approaching the holder 50 against the force of the elastic body 69, so that the protrusion 70 is pulled out of the concave portion 71, and the guide member 63 is rotated with respect to the output shaft 30. Specifically, the guide member 63 is rotated with respect to the output shaft 30 by 90 degrees from the position of FIG. 4B, and the guide member 63 is stopped at the position of FIG. 4A. The direction of rotation of the guide member 63 may be clockwise or counterclockwise in FIG. 4.

The clamps 61 come in contact with the curved surfaces 66 in the middle of the rotation of the guide member 63 by 90 degrees from the position of FIG. 4B, and then, the clamps 61 move in the direction of approaching the second axis line B1, so that the second falling-stopper portion 62 engages with the first falling-stopper portion 58. This is because the inner diameter φ2 is smaller than the inner diameter φ1. When the first and second falling-stopper portions 58 and 62 engage with each other, the tool fixing member 55 is fixed to the output shaft 30 in the direction along the second axis line B1. Also, the tool fixing member 55 is attached to the second shaft 46. This state is the locked state or locked position of the clamps 61.

When the operator releases his/her hand from the guide member 63 after stopping the guide member 63, the guide member 63 is pushed by the force of the elastic body 69, so that the protrusion 70 moves into the concave portion 71 as shown in FIG. 3A, and the guide member 63 does not rotate with respect to the output shaft 30. As shown in FIG. 4B, when the guide member 63 is stopped so that the clamps 61 and the curved surfaces 66 are set at the same position as each other in the circumferential direction, the position of the guide member 63 with respect to the output shaft 30 is a first rotation position. Further, when the lever 73 is rotated counterclockwise in FIGS. 1 and 2, the first and second shafts 42 and 46 move in the direction away from the tool supporting unit 47, and the first and second shafts 42 and 46 stop when the tip tool 52 is clamped between the head portion 57 and the tool supporting unit 47. The cam surface 74 is away from the first shaft 42 due to the rotation of the lever 73, and the operator stops the lever 73 at the initial position. In this manner, the tip tool 52 is fixed to the tool supporting unit 47.

When the operator operates the lever 73 to move the second shaft 46 with respect to the output shaft 30 in the direction along the second axis line B1 as described above, the tool fixing member 55 becomes in the released state, and the clamps 61 becomes in their locked state as shown in FIGS. 4A and 6 even if the fixing force applied to the tip tool 52 is reduced, and therefore, the tip tool 52 is not detached from the tool fixing member 55.

Figure 7:
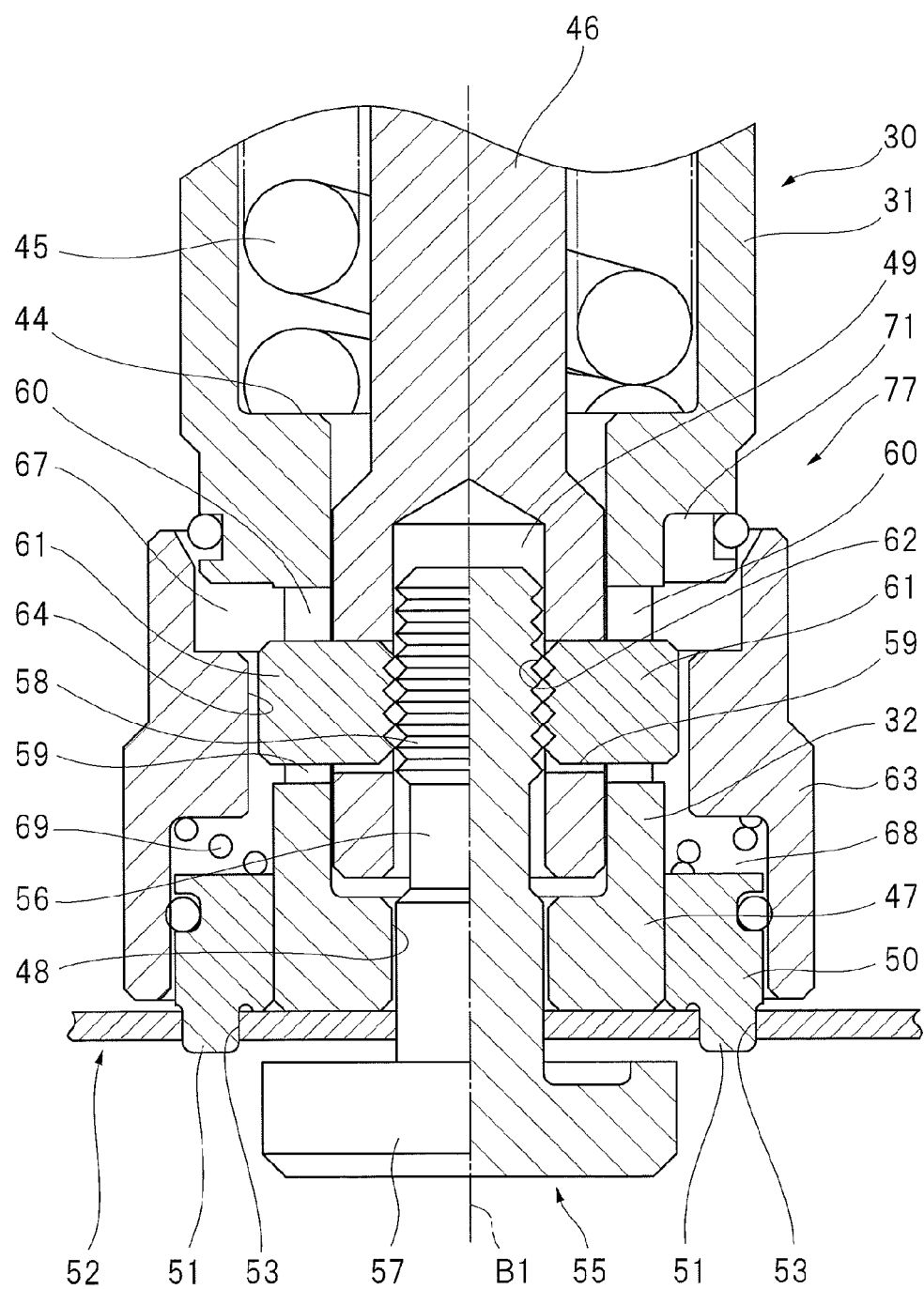
FIG. 7 is a side cross-sectional view showing a state in which the clamp member is released from its lock state in the first specific example of the attachment mechanism.

The operator holds the guide member 63 and moves it in the direction along the second axis line B1 after putting the tool fixing member 55 into the released state, and then, rotates it by 90 degrees so as to center the second axis line B1, the clamps 61 in the unlocked state as shown in FIGS. 4B and 7. Therefore, the tool fixing member 55 is detached from the second shaft 46, and the tip tool 52 can be detached from the tool fixing member 55.

The operator can detach the tip tool 52 from the tool supporting unit 47 by performing a first operation of manipulating the lever 73 to switch the tool fixing member 55 from the fixed state to the release state and a second operation of manipulating the guide member 63 to switch the clamps 61 from the locked state to the unlocked state. Therefore, the unexpected detachment of the tip tool 52 from the tool supporting unit 47 is prevented.

Next, a second structural example of the fixing mechanism and the attachment mechanism provided in the powered working machine 10 of FIGS. 1 and 2 will be described with reference to FIGS. 8 to 11. The structure of the clamps 61 and guide member 63 shown in FIGS. 8 to 11 is different from the structure of the clamps 61 and guide member 63 shown in FIGS. 1 to 6. The structure of the two clamps 61 and guide member 63 shown in FIGS. 8 to 11 will be described below. A retaining hole 78 is formed on the outer surface of each of the two clamps 61 in the radial direction centering the second axis line B1. An elastic body 79 is provided inside the retaining hole 78, and a rotation-stopper member 80 pushed by the force of the elastic body 79 is arranged. As the elastic body 79, a metal compression coil spring is used. The rotation-stopper member 80 is a metal ball, and the rotation-stopper member 80 is arranged inside the retaining hole 78. The rotation-stopper member 80 is smaller in outer diameter than the retaining hole 78. The rotation-stopper member 80 is pushed by the force of the elastic body 79 toward the outside of the retaining hole 78.

An engagement hole 81 penetrating through the guide member 63 in the radial direction is formed on the guide member 63. The engagement hole 81 is formed so as to center the unreal line X2 perpendicular to the second axis line B1. The engagement hole 81 has a large-diameter portion 82 and a small-diameter portion 83. The inner diameter of the large-diameter portion 82 is larger than that of the small-diameter portion 83, and the inner diameter of the large-diameter portion 82 is larger than the outer diameter of the rotation-stopper member 80. The small-diameter portion 83 is arranged outside the large-diameter portion 82 in the radial direction centering the second axis line B1. In other words, the large-diameter portion 82 is opened on the curved surface 66.

A push rod 85 is arranged inside the engagement hole 81. The push rod 85 has a shaft unit 86 and a head portion 87 being larger in outer diameter than the shaft unit 86. The shaft unit 86 is arranged inside the small-diameter portion 83, while the head portion 87 is arranged inside the large-diameter portion 82. The head portion 87 has the outer diameter larger than the inner diameter of the small-diameter portion 83. The push rod 85 can move in the engagement hole 81 in the direction along the unreal line X2. Inside the engagement hole 81, a stepped portion 84 continuously connecting the large-diameter portion 82 and small-diameter portion 83 is provided.

A processed hole 88 is formed at a position of the guide member 63 which is away from the engagement hole 81 by 180 degrees. The processed hole 88 is formed at the same position as that of the engagement hole 81 in the direction along the second axis line B1. In other words, the processed hole 88 is formed so as to center the unreal line X2 perpendicular to the second axis line B1. The processed hole 88 penetrates through the guide member 63 in the radial direction, and the processed hole 88 is closed by a plug 89.

The processed hole 88 is made during a process of manufacturing the guide member 63. A tool is inserted into the processed hole 88, and the engagement hole 81 is cut. After the engagement hole 81 is formed on the guide member 63, the processed hole 88 is closed by the plug 89.

A stopper 90 is fixed to the outer peripheral surface of the small-diameter portion 32 of the output shaft 30. The stopper 90 is annular, and the stopper 90 is arranged between the guide member 63 and the holder 50 in the direction along the second axis line B1. The stopper 90 has the outer diameter larger than the inner diameter r1 of the guide member 63.

Figure 8:
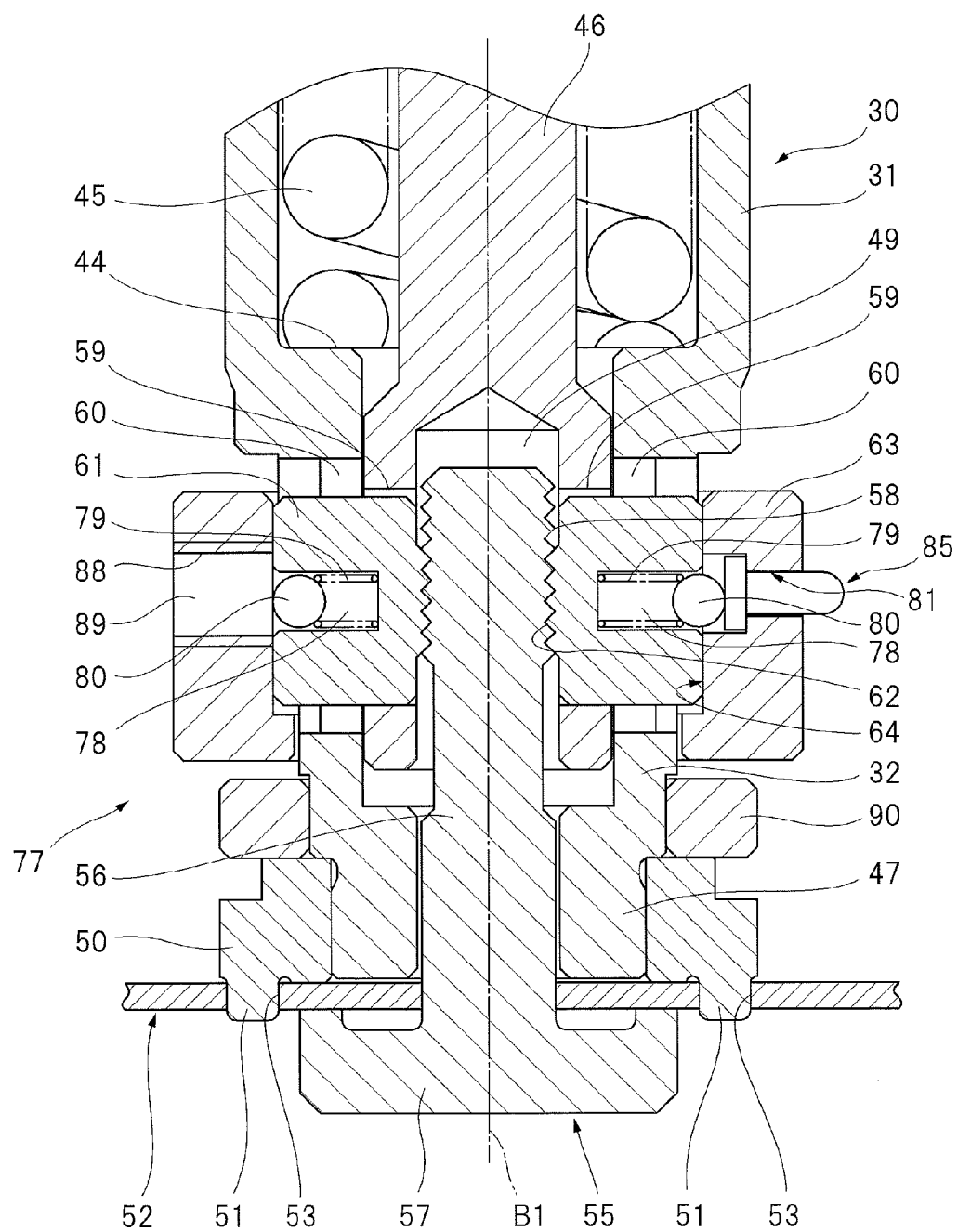
FIG. 8 is a side cross-sectional view showing a state in which a tool fixing member is fixed in a second specific example of the attachment mechanism.

An example of an operation performed when the powered working machine 10 shown in FIGS. 1 and 2 is attached to the attachment mechanism 77 shown in FIGS. 8 to 11 will be described. When the lever 73 is held at the initial position, the tool fixing member 55 is pressed against the tip tool 52, so that a fixing force is applied to the tip tool 52. When one rotation-stopper member 80 is partially positioned in the large-diameter portion 82 of the engagement hole 81 as shown in FIGS. 8 and 11A, the force of engagement between the rotation-stopper member 80 and the guide member 63 prevents the guide member 63 from rotating with respect to the output shaft 30. The force of the elastic body 79 is transmitted to the push rod 85 via the rotation-stopper member 80, so that the head portion 87 is in contact with the stepped portion 84 to stop the push rod 85. In the stop state of the push rod 85, an end of the shaft unit 86 is exposed outside from the engagement hole 81. That is, the end of the shaft unit 86 protrudes outward from the outer peripheral surface of the guide member 63.

When the guide member 63 cannot rotate with respect to the output shaft 30 as shown in FIGS. 8 and 11A, the two clamps 61 are on the unreal line X2. In other words, the two clamps 61 are at the same position as that of the curved surfaces 66, respectively, in the circumference direction centering the second axis line B1. The second falling-stopper portions 62 of the two clamps 61 are engaged with the first falling-stopper portion 58 of the shaft unit 56, and the two clamps 61 are in contact with the curved surfaces 66. Therefore, the two clamps 61 cannot move in the radial direction centering the second axis line B1, and the second shaft 46 and the tool fixing member 55 are fixed in the direction along the second axis line B1. The second shaft 46 is pushed by the force of the elastic body 45 in the direction of approaching the support shaft 33, so that the tip tool 52 is clamped between the tool fixing member 55 and the output shaft 30, and the tip tool 52 is fixed in the direction along the second axis line B1. In other words, the tool fixing member 55 is in the fixed state.

The operator operates the lever 19 in the state that the battery pack 13 is attached to the mounting unit 16, so that the motor shaft 17 of the electric-powered motor 11 can be switched between the rotation and the stoppage.

Figure 9:
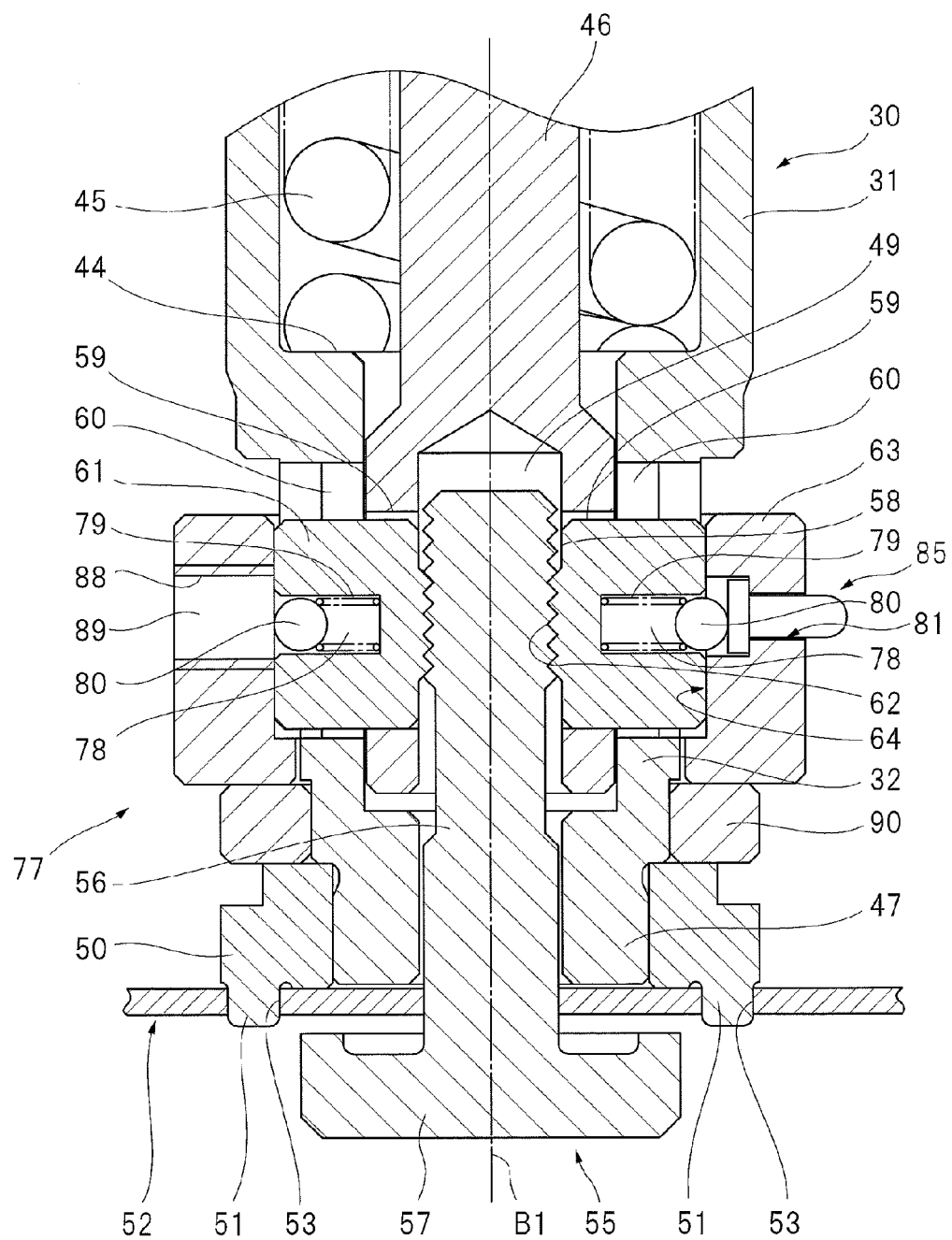
FIG. 9 is a side cross-sectional view showing a state in which the tool fixing member is released in the second specific example of the attachment mechanism.

On the other hand, when the tip tool 52 is detached therefrom, the operator performs the following work. When the lever 73 is rotated by a predetermined angle from the initial position, the second shaft 46 moves in the direction of approaching the tool supporting unit 47 against the force of the elastic body 45, and then, stops as shown in FIG. 9. As a result, the force of the head portion 57 which presses the tip tool 52 against the tool supporting unit 47 is reduced. A state of the reduction in the pressing force of the tool fixing member 55 applied to the tip tool 52 is the released state of the tool fixing member 55. Note that the tool fixing member 55 is coupled to the second shaft 46 even when the force that fixes the tip tool 52 to the output shaft 30 is reduced, so that the tip tool 52 is not pulled out from the tool fixing member 55.

The operator pushes the push rod 85 against the force of the elastic body 79, so that the rotation-stopper member 80 is moved into the retaining hole 78. Then, the force of engagement between the rotation-stopper member 80 and the guide member 63 is reduced. The operator rotates the guide member 63 with respect to the output shaft 30 counterclockwise from the state of FIG. 11. Because the rotation-stopper member 80 is pushed by the force of the elastic body 79, the rotation-stopper member 80 rolls along the curved surface 66, and then, the contact target of the rotation-stopper member 80 is changed from the curved surface 66 to the curved surface 65 by the increase in the rotation angle of the guide member 63. The operator rotates the guide member 63 by 90 degrees from its position of FIG. 11, and stops the guide member 63 at its position of FIGS. 10 and 11B. That is, both of the two clamps 61 are on the unreal line X1 while the two rotation-stopper members 80 pushed by the elastic body 79 are in contact with the curved surfaces 65.

Then, the operator holds the tool fixing member 55 with his/her hand, and pulls it in the direction away from the output shaft 30. Meanwhile, the inner diameter φ1 formed by the two curved surfaces 65 is larger than the inner diameter φ2 formed by the two curved surfaces 66. Therefore, the two clamps 61 is moved in the direction of approaching the curved surfaces 65 against the force of the elastic body 79 by a component of the force of engagement between the first falling-stopper portion 58 and the second falling-stopper portions 62. By the movement of the two clamps 61 in the radial direction centering the second axis line B1, the first falling-stopper portion 58 and the second falling-stopper portions 62 are laid on each other. Therefore, the shaft unit 56 of the tool fixing member 55 can be pulled out of the retaining hole 49 and fixing hole 54, and the tip tool 52 can be detached from the tool supporting unit 47.

In other words, as shown in FIGS. 10 and 11B, when the clamps 61 are put in the movable state in the radial direction, the tool fixing member 55 can be moved in the direction along the second axis line B1 with respect to the output shaft 30. A state of the clamps 61 obtained when the tool fixing member 55 can be moved in the direction along the second axis line B1 with respect to the output shaft 30 is the unlocked state. At this time, a position of the guide member 63 in the circumferential direction with respect to the output shaft 30 is the second rotation position.

Next, work of attaching the tip tool 52 to the tool supporting unit 47 will be described. The operator inserts the shaft unit 56 of the tool fixing member 55 into the fixing hole 54 of the tip tool 52. When the clamps 61 are in their unlocked state, the operator moves the shaft unit 56 into the shaft hole 48. As a result, the shaft unit 56 moves into a space between the two clamps 61 as shown in FIGS. 10 and 11B.

Then, the operator rotates the guide member 63 clockwise with respect to the output shaft 30 in FIG. 11B while holding the guide member 63 with his/her hand, the rotation-stopper members 80 roll along the curved surfaces 65, and then, roll along the curved surfaces 66. That is, the rotation-stopper members 80 move inside the retaining holes 78 in the direction of approaching the second axis line B1, and the clamps 61 also move in the direction of approaching the second axis line B1. When the operator rotates the guide member 63 clockwise by 90 degrees from its position of FIG. 11B and stops the guide member 63, one rotation-stopper member 80 enters the engagement hole 81 as shown in FIG. 11A. This renders the guide member 63 cannot rotate with respect to the output shaft 30.

As described above, when the guide member 63 is rotated to move the clamps 61 in the direction of approaching the second axis line B1 and to engage the second falling-stopper portions 62 with the first falling-stopper portion 58, the tool fixing member 55 is fixed in the direction along the second axis line B1 with respect to the output shaft 30. Also, the tool fixing member 55 is held to be attached to the second shaft 46. This state is the locked state of the clamps 61.

As shown in FIG. 11(A), when the guide member 63 is stopped so that the clamps 61 and the curved surfaces 66 are set at the same position in the circumferential direction, the position of the guide member 63 to the output shaft 30 is the first rotation position. When the lever 73 is rotated counterclockwise in FIGS. 1 and 2, the second shaft 46 moves in the direction away from the tool supporting unit 47, and the tip tool 52 is clamped between the head portion 57 and the tool supporting unit 47, so that the second shaft 46 stops. In this manner, the tip tool 52 is fixed to the tool supporting unit 47.

As described above, when the operator operates the lever 73 to move the second shaft 46 in the direction along the second axis line B1 with respect to the output shaft 30, the tool fixing member 55 is put in the released state. Therefore, even if the fixing force applied to the tip tool 52 is reduced, the tip tool 52 is not detached from the tool fixing member 55 since the clamps 61 are in their locked state as shown in FIG. 9.

When the operator pushes the push rod 85 and rotates the guide member 63 after the operator puts the tool fixing member 55 in the released state, the clamps 61 are put in the unlocked state as shown in FIGS. 10 and 11B. Therefore, the tool fixing member 55 can be detached from the second shaft 46, and the tip tool 52 can be detached from the tool fixing member 55.

The operator can detach the tip tool 52 from the tool supporting unit 47 by performing the first operation of manipulating the lever 73 to switch the tool fixing member 55 from the fixed state to the released state and the second operation of manipulating the guide member 63 to switch the clamps 61 from the locked state to the unlocked state. Therefore, the unexpected detachment of the tip tool 52 from the tool supporting unit 47 can be prevented.

When the position of the guide member 63 is switched between the first rotation position and the second rotation position, the guide member 63 may be rotated either clockwise or counterclockwise in FIG. 11.

According to this embodiment, in the first and second specific examples of the attachment mechanism 77, the second falling-stopper portions 62 formed on the two respective clamps 61 are engaged from both sides with the first falling-stopper portion 58 of the tool fixing member 55, and therefore, the tool fixing member 55 is not detached from the second shaft 46 by merely setting the guide member 63 at the second rotation position. Therefore, the unexpected detachment of the tool fixing member 55 is prevented.

In the first and second specific examples of the attachment mechanism 77, when the tool fixing member 55 is fixed to the second shaft 46, the clamps 61 are urged substantially uniformly from both sides of the tool fixing member 55. Therefore, the tool fixing member 55 fixed to the second shaft 46 is prevented from tilting against the second axis line B1. This effect is particularly remarkable in the second specific example of the attachment mechanism 77 since the clamps 61 are urged by the force of the elastic body 79.

The guide member 63 is provided to not the machine main body 12 that is a stationary system but the output shaft 30 that is an oscillation system. As a result, when the tip tool 52 is driven, the guide member 63 is moved in coordination with the tip tool 52, and therefore, the tool fixing member 55 is not locked with respect to the machine main body 12, so that the work can be securely performed.

In the first and second specific examples of the attachment mechanism 77, the guide member 63 is arranged close to the tip tool 52. Therefore, the operator can manipulate the guide member 63 while holding the tip tool 52, so that the operations are simplified. The operator can also attach/detach the tip tool 52 to/from the second shaft 46 by rotating the guide member 63 clockwise and counterclockwise within the angel range of 90 degrees. In other words, the tip tool 52 can be attached/detached to/from the second shaft 46 without rotating the guide member 63 several times as a screw member, and therefore, workability is improved.

The above-described embodiments include the following configuration examples of the powered working machine.

Configuration Example 1

A powered working machine which drives a tip tool with power of a driving source, includes: a tool supporting member to which the tip tool is fixed; a tool fixing member which can be attached/detached to/from the tool supporting member, which is attached to the tool supporting member, and which cooperates with the tool supporting member to clamp and fix the tip tool from both sides of the tool supporting member in a direction along an axis line; a lock member which is movable in a direction crossing the axis line and which engages with the tool fixing member; and a switching member which is arranged outside the lock member in the crossing direction, which can rotate so as to center the axis line, and which can be switched between a first rotation position at which the lock member cannot move in the crossing direction and a second rotation position at which the lock member can move in the crossing direction.

Configuration Example 2

In the powered working machine described in the configuration example 1, a rotation preventing mechanism that holds the switching member at the first rotation position is provided.

Configuration Example 3

In the powered working machine described in the configuration example 2, the switching member has a guide hole in which the lock member is arranged, and, as a diameter of the guide hole, an inner diameter of a portion where the switching member is at the second rotation position so that the lock member can move in the crossing direction is larger than an inner diameter of a portion where the switching member is at the first rotation position so that the lock member cannot move in the crossing direction.

Configuration Example 4

In the powered working machine described in the configuration example 3, the guide hole has an elliptical shape.

Configuration Example 5

A powered working machine which drives a tip tool with power of a driving source provided in a machine main body, includes: a tool supporting member to which the tip tool is fixed; a tool fixing member having a concave/convex portion formed on its outer peripheral surface and which is attached/detached to/from the tool supporting member to hold the tip tool; an operating member that moves the tool supporting member in a longitudinal direction of the tool fixing member; a lock member which is engaged with the concave/convex portion of the tool fixing member so that the tool fixing member can be attached/detached to/from the tool supporting member; and a switching member which switches the lock member at a locked position at which the lock member is engaged with the concave/convex portion and an unlocked position at which the lock member is away from the concave/convex portion.

Configuration Example 6

A powered working machine which drives a tip tool with power of a driving source provided in a machine main body, includes: a tool supporting member to which the tip tool is fixed; a tool fixing member which can be attached/detached to/from the tool supporting member and which holds the tip tool; an operating member which moves the tool supporting member in a longitudinal direction of the tool fixing member; and an attachment mechanism which can attach/detach the tool fixing member to/from the tool supporting member, and the operating member is provided to the machine main body, and the attachment mechanism is provided to the tool supporting member.

The corresponding relation between the configuration described in the embodiments and the configuration of the present invention will be described as follows. The output shaft 30 corresponds to the tool supporting member of the present invention, the clamp 61 corresponds to the lock member of the preset invention, the guide member 63 corresponds to the switching member of the preset invention, the curved surface 66 corresponds to a first inner peripheral surface of the preset invention, the curved surface 65 corresponds to a second inner peripheral surface of the preset invention, the elastic body 45 corresponds to a first elastic body of the preset invention, the lever 73 corresponds to the operating member of the preset invention, and the elastic body 69, protrusion 70, and concave portion 71 correspond to a rotation preventing mechanism of the preset invention. The elastic body 79, rotation-stopper member 80, and engagement hole 81 correspond to the rotation preventing mechanism of the preset invention. The concave portion 71 corresponds to a first engagement portion of the preset invention, the protrusion 70 corresponds to a second engagement portion of the preset invention, and the elastic body 69 corresponds to a second elastic body of the preset invention.

It is needless to say that the present invention is not limited to the foregoing embodiments and various modifications and alterations can be made within the scope of the present invention. For example, in the powered working machine of the present invention, a plurality of types of different works can be performed by the replacement and the attachment of the tip tools which are different in a shape, a material, a type, etc. to from each other. A shape of the tip tool may be a blade shape, a circular shape, a columnar shape, etc. The different works include a work of cutting a workpiece, a work of grinding a workpiece, a work of polishing a workpiece, a work of peeling a workpiece from an object, and others. In other words, the powered working machine of the present invention includes a screwdriver, a cutter, and a sander.

The power transmission mechanism which transmits power of the electric-powered motor to the tip tool includes a power transmission mechanism which reciprocates the tip tool within a predetermined range of angle, a power transmission mechanism which rotates the tip tool in one direction, a power transmission mechanism which rotates the tip tool forward and reversely, and others. The operating member may be not only the lever which rotates so as to center the support shaft within a predetermined range of angle but also a pushbutton which is moved in the direction of the axis line from its initial position, and then, is stopped by a first pushing operation, moves and stops, and then, returns to the initial position by a second pushing operation.

As the elastic bodies 45, 69, and 79, a synthetic rubber, synthetic resin, etc. may be used instead of a metal spring. As the electric-powered motor, either a brushless motor or a motor with a brush may be used. In the present invention, as the driving source that actuates the tip tool, not only the electric-powered motor but also an air motor, engine, etc. may be used. The powered working machine of the embodiments has not only the structure in which the battery pack serving as a direct-current power supply is attached to the machine main body but also a structure in which the machine main body is provided with a power cord to be connected to an alternate-current power outlet. The rotation-stopper mechanism may have a structure in which the first engagement portion is a protrusion and the second engagement portion is also a protrusion.

The second structural example described with reference to FIGS. 8 to 11 may have a configuration without the push rod 85. In this case, the guide member 63 has the same structure as its structure described in the first structural example described with reference to in FIGS. 3 to 7. The clamps 61 have a configuration with the elastic body 79 and the rotation-stopper members 80 as similar to the second structural example. At the first rotation position of the guide member 63 at which the locked state is caused, the rotation-stopper members 80 are urged by the elastic bodies 79 toward the curved surfaces 66, and the clamps 61 are pushed toward the second axis line B, so that the locking can be securely performed. On the other hand in order to put the rotation position of the guide member 63 to the second rotation position at which the unlocked state is caused, the guide member 63 may be moved in the direction of approaching the holder 50 so as to pull the protrusion 70 out of the concave portion 71 and rotate the guide member 63 with respect to the output shaft 30 as similar to the first structure example.

The present invention relates to a powered working machine which drives a tip tool with power from an electric-powered motor serving as a driving source and which performs a work of polishing, cutting, hacking, or grinding a workpiece by using the tip tool.

REFERENCE SIGNS LIST

10 . . . Powered working machine
11 . . . Electric-powered motor
30 . . . Output shaft
52 . . . Tip tool
55 . . . Tool fixing member
76 . . . Fixing mechanism
77 . . . Attachment mechanism
B1 . . . Axis line

What is claimed is:

1. A powered working machine comprising:
   a tip tool which is driven by power of a driving source;
   a tool supporting member to which the tip tool is fixed;
   a tool fixing member which cooperates with the tool supporting member to clamp the tip tool in a direction along an axis line;
   a fixing mechanism which is arranged so as to be movable in the direction along the axis line and which generates or releases a force with which the tool supporting member and the tool fixing member clamp the tip tool; and
   an attachment mechanism which can rotate so as to center the axis line and which can attach/detach the tool fixing member to/from the tool supporting member, wherein
   the tool fixing member can move in a direction along the axis line, and has a fixed state in which the tip tool is fixed to the tool supporting member and a released state in which the tip tool is not fixed to the tool supporting member,
   the attachment mechanism includes:
   a lock member which can move in a direction crossing the axis line, and which has a locked state in which a state of attachment of the tool fixing member to the tool supporting member is maintained and an unlocked state in which the tool fixing member can be detached from the tool supporting member; and
   a switching member which is rotated so as to center the axis line by an operator's operation, and which has a first rotation position at which the lock member is put in the locked state and a second rotation position at which the lock member is put in the unlocked state, the powered working machine further comprises an operating member which moves the fixing mechanism in a direction along the axis line against a force of a first elastic body so as to put the tool fixing member in the released state by an operator's operation, and the operating member and the switching member are separated from each other in the direction along the axis line.

2. The powered working machine according to claim 1, wherein the switching member includes a guide hole in which the lock member is arranged, the guide hole has a first inner peripheral surface formed into an arc shape centering the axis line and a second inner peripheral surface which is formed into an arc shape on a part of a circumference centering the axis line different from a part of the first inner peripheral surface and which is larger in an inner diameter than the first inner peripheral surface, when the switching member is at the first rotation position, the lock member and the first inner peripheral surface are at the same position as each other in a circumference direction centering the axis line, and, when the switching member is at the second rotation position, the lock member and the second inner peripheral surface are at the same position as each other in the circumference direction centering the axis line.

3. The powered working machine according to claim 1, wherein the first elastic body generates a force for holding the tool fixing member in the fixed state.

4. The powered working machine according to claim 1, further comprising a rotation preventing mechanism which holds the switching member at the first rotation position.

5. The powered working machine according to claim 4, wherein the rotation preventing mechanism includes:
   a first engagement portion which is arranged in the tool supporting member;
   a second engagement portion which is arranged in the switching member and which engages with the first engagement portion; and
   a second elastic body which applies a force acting in a direction along the axis line to the switching member and by which the first engagement portion and the second engagement portion are engaged with each other.

6. The powered working machine according to claim 4, wherein the rotation preventing mechanism includes:
   an engagement hole which is arranged in an inner peripheral surface of the switching member; and
   a rotation-stopper member which is attached so as to be movable to the lock member in a radial direction and which enters the engagement hole to hold the switching member at the first rotation position.

7. The powered working machine according to claim 1, wherein
   the switching member includes an operating portion operable by user,
   the operating member includes an lever operable by user, and
   the operating portion and the lever are separated from each other in the shaft direction.

8. The powered working machine according to claim 1, wherein the first elastic body is disposed in between the operating member and the switching member.

9. A powered working machine comprising:
   a tip tool which is driven by power of a driving source;
   a tool supporting member to which the tip tool is fixed;
   a tool fixing member which cooperates with the tool supporting member to clamp the tip tool in a direction along an axis line;
   a fixing mechanism which is arranged so as to be movable in the direction along the axis line and which generates or releases a force with which the tool supporting member and the tool fixing member clamp the tip tool;
   an operating member which moves the fixing mechanism in the direction along the axis line; and
   an attachment mechanism which can rotate so as to center the axis line and which allows the tool fixing member to be attached/detached to/from the tool supporting member,
   wherein the tip tool can be detached from the tool supporting member by moving the fixing mechanism in the direction along the axis line to release a fixation-force in the direction along the axis line, and then, rotating the attachment mechanism to release a fixation-force in the direction crossing the axis line.

* * * * *